United States Patent
Moser et al.

(10) Patent No.: US 10,188,968 B2
(45) Date of Patent: Jan. 29, 2019

(54) CANDLE FILTER SUPPORT AND PLATE ASSEMBLY FOR POLYMER MELTS

(71) Applicant: Westlake Longview Corporation, Houston, TX (US)

(72) Inventors: Kenneth Wayne Moser, Longview, TX (US); Andrew Colin Lewis, Hallsville, TX (US); Bert Eugene Allen, Longview, TX (US); Stephen Wayne Coe, Longview, TX (US); Douglas James Landry, Sulphur, LA (US); Wayne Scott Strasser, Kingsport, TN (US)

(73) Assignee: Westlake Longview Corporation, Houston, TX (US)

( * ) Notice: Subject to any disclaimer, the term of this patent is extended or adjusted under 35 U.S.C. 154(b) by 178 days.

(21) Appl. No.: 15/338,792

(22) Filed: Oct. 31, 2016

(65) Prior Publication Data

US 2018/0117504 A1    May 3, 2018

(51) Int. Cl.
    *B01D 29/15*        (2006.01)
    *B01D 29/21*        (2006.01)
               (Continued)

(52) U.S. Cl.
    CPC ............ *B01D 29/15* (2013.01); *B01D 29/21* (2013.01); *B01D 29/96* (2013.01); *B29B 13/10* (2013.01);
               (Continued)

(58) Field of Classification Search
None
See application file for complete search history.

(56) References Cited

U.S. PATENT DOCUMENTS 2,789,699 A * 4/1957 Pistor ................ B01D 35/02
                                                   210/448
3,177,945 A    4/1965    Fether
                  (Continued)

FOREIGN PATENT DOCUMENTS

DE             211 312 A1    7/1984
DE     20 2016 105013 U1    9/2016
                 (Continued)

OTHER PUBLICATIONS

"CSC-P Large area screen changer for polymer processes," MAAG Filtration Systems, pp. 1-2 (Mar. 2012).

(Continued)

*Primary Examiner* — Benjamin M Kurtz
(74) *Attorney, Agent, or Firm* — Phan Law Group PLLC

(57) ABSTRACT

A polymer melt candle filter having a support which comprises a hollow cylindrical body defined by a first end, a second end, and a cylinder wall having a first end portion and a second end portion. The first end portion includes a screw thread on its outside surface and optionally a hex fitting on its inside surface for receiving a hex wrench. The second end portion includes a plurality of holes in the cylinder wall. The area of the openings of the holes on the outside surface of the cylinder wall may be larger than the area of the openings of the corresponding holes on the inside surface of the cylinder wall. The shape of the openings of the holes on the outside surface may be non-circular. A polymer melt filter plate assembly which comprises (a) a support plate comprising a plurality of threaded holes; (b) at least one filter which is screwed into at least one of the threaded holes via the screw thread on the outside surface of the first end portion of the filter support; (c) a tie rod with (i) a first end extending through a hole in a cone insert and a cap located at the second end of the filter support, and (ii) a second end extending through a threaded hole in the support (Continued)

plate; and (d) a cross bar which is attached to the second end of the tie rod for holding the support plate inside a shaft of an apparatus for filtering a polymer melt.

17 Claims, 11 Drawing Sheets

(51) Int. Cl.
*B29C 47/68* (2006.01)
*B01D 29/96* (2006.01)
*B29C 45/24* (2006.01)
*B29C 47/08* (2006.01)
*B29B 13/10* (2006.01)
*B29K 105/00* (2006.01)

(52) U.S. Cl.
CPC .......... *B29C 45/24* (2013.01); *B29C 47/0842* (2013.01); *B29C 47/682* (2013.01); *B29C 47/687* (2013.01); *B01D 2201/0407* (2013.01); *B01D 2201/0415* (2013.01); *B01D 2201/4092* (2013.01); *B29K 2105/0067* (2013.01)

(56) References Cited

U.S. PATENT DOCUMENTS

| 4,701,118 | A | 10/1987 | Koching et al. |
| 5,004,414 | A | 4/1991 | Stude et al. |
| 5,125,823 | A | 6/1992 | Kreyenborg |
| 5,638,960 | A | 6/1997 | Beuermann et al. |
| 5,922,194 | A | 7/1999 | Bruckmann et al. |
| 6,135,145 | A | 10/2000 | Bolling |
| 6,641,728 | B2 | 11/2003 | Emhardt |
| 2005/0161391 | A1* | 7/2005 | Ettlinger ............. B01D 33/073 210/396 |
| 2010/0300986 | A1 | 12/2010 | Ohanesian |
| 2013/0126410 | A1* | 5/2013 | Arita ....................... B01D 29/15 210/232 |
| 2018/0071967 | A1* | 3/2018 | Schroder ................ B29B 13/10 |

FOREIGN PATENT DOCUMENTS

| EP | 2 045 437 A2 | 4/2009 |
| EP | 2 548 711 A1 | 1/2013 |
| FR | 2 034 090 A1 | 12/1970 |
| GB | 2 219 221 A | 12/1989 |
| JP | H10-217281 A | 8/1998 |

OTHER PUBLICATIONS

"Micronex Filter elements for large-area polymer filtration systems," MAAG Filtration Systems, pp. 1-2 (Mar. 2012).
"Multinex Filter candles for large area screen changers," MAAG Filtration Systems, pp. 1-2 (Mar. 2012).
"Ultipleat(R) Polymer Candle Technology," Pall Corp., pp. 1-12 (2008).
Int'l Search Report and Written Opinion of the Int'l Searching Authority issued in Int'l Application No. PCT/US2017/058271.

* cited by examiner

CANDLE FILTER SUPPORT AND PLATE ASSEMBLY FOR POLYMER MELTS

FIELD OF THE INVENTION

The invention generally relates to filters for polymer melts.

BACKGROUND OF THE INVENTION

Thermoplastic polymers in the molten state are often filtered to remove impurities, such as solids and/or gels, before they are passed to a mold cavity or through a die plate. Examples of polymer filtering devices are shown in U.S. Pat. No. 4,701,118, U.S. Pat. No. 5,004,414, and U.S. Pat. No. 6,641,728.

The filter portion of these devices typically includes a foraminous supporting plate and a plurality of filters resembling sticks or candles. The filters themselves are composed of tubular support structures with one or more filter media in the form of a sleeve wrapped around the tubular support structures.

Both the foraminous supporting plates and the tubular support structures available in the market today, however, suffer from a number of disadvantages. For example, the design of the tubular support structures is not very efficient for filtering or for replacement. Moreover, the foraminous supporting plates and the tubular support structures are susceptible to cracking and breakage under normal use.

Thus, there is a need in the art for improved foraminous supporting plates and tubular support structures for filtering polymer melts.

The present invention addresses this need as well as others, which will become apparent from the following description and the appended claims.

SUMMARY OF THE INVENTION

The invention is as set forth in the appended claims.

Briefly, in a first aspect, the present invention provides a polymer melt filter support. In one embodiment, the filter support comprises:

a hollow cylindrical body defined by a first end, a second end, and a cylinder wall having a first end portion and a second end portion;

a screw thread on the outside surface of the first end portion; and a plurality of holes in the cylinder wall at the second end portion, wherein the holes allow for a polymer melt outside of the cylindrical body to flow inside of the cylindrical body, wherein the first end comprises an opening for the polymer melt inside of the cylindrical body to flow outside of the cylindrical body, wherein the area of the openings of the holes on the outside surface of the cylinder wall is larger than the area of the openings of the corresponding holes on the inside surface of the cylinder wall, and wherein the shape of the openings of the holes on the outside surface is non-circular.

In a second aspect, the present invention provides a polymer melt filter. The filter comprises a filter support according to invention and one or more filter elements around the second end portion of the cylindrical body.

In a third aspect, the present invention provides a polymer melt filter plate assembly. The plate assembly comprises:

(a) a support plate comprising a plurality of threaded holes; and (b) at least one filter according to the invention, which is screwed into at least one of the threaded holes via the screw thread on the outside surface of the first end portion of the cylindrical body.

In a fourth aspect, the present invention provides a process for filtering a polymer melt. The process comprises passing a polymer melt through the one or more filter elements around the second end portion of the cylindrical body of the polymer melt filter according to the invention, and withdrawing a filtered polymer melt from the inside of the cylindrical body.

DETAILED DESCRIPTION OF THE PREFERRED EMBODIMENTS

In a first aspect, the present invention provides a polymer melt filter support. In one embodiment, the filter support comprises:

a hollow cylindrical body defined by a first end, a second end, and a cylinder wall having a first end portion and a second end portion;

a screw thread on the outside surface of the first end portion; and a plurality of holes in the cylinder wall at the second end portion, wherein the holes allow for a polymer melt outside of the cylindrical body to flow inside of the cylindrical body, wherein the first end comprises an opening for the polymer melt inside of the cylindrical body to flow outside of the cylindrical body, wherein the area of the openings of the holes on the outside surface of the cylinder wall is larger than the area of the openings of the corresponding holes on the inside surface of the cylinder wall, and wherein the shape of the openings of the holes on the outside surface is non-circular.

In another embodiment, the polymer melt filter support comprises:

a hollow cylindrical body defined by a first end, a second end, and a cylinder wall having a first end portion and a second end portion;

a screw thread on the outside surface of the first end portion;

a hex fitting on the inside surface of the first end portion for receiving a hex wrench; and a plurality of holes in the cylinder wall at the second end portion, wherein the holes allow for a polymer melt outside of the cylindrical body to flow inside of the cylindrical body, wherein the first end comprises an opening for the polymer melt inside of the cylindrical body to flow outside of the cylindrical body.

Figure 1:
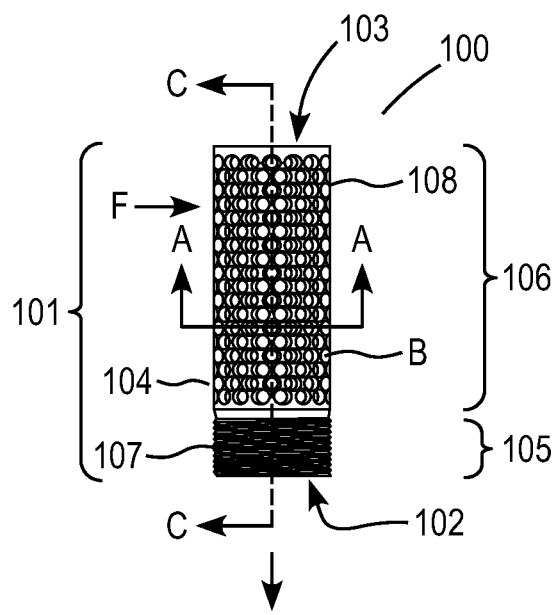
FIG. 1 is an elevation view of a polymer melt filter support according to one embodiment of the invention.

FIG. 1 shows a polymer melt filter support 100 according to an embodiment of the invention. The filter support 100 includes a hollow cylindrical body 101, which resembles the shape of a tube. The body 101 includes or is defined by a first end 102, a second end 103 (opposite the first end 102), and a cylinder wall 104 (disposed between the two ends 102 and 103). The cylinder wall 104 includes a first end portion 105 proximate or adjacent to the first end 102 and a second end portion 106 proximate or adjacent the second end 103. The first end portion 105 includes a screw thread 107 on at least a portion of its outside surface. The screw thread 107 is adapted to engage and securely hold the filter support 100 in place with threaded holes in a support plate 1604 (see FIGS. 16-19).

The second end portion 106 of the cylinder wall 104 includes a plurality of holes 108. The holes 108 extend through the cylinder wall 104 so as to allow a polymer melt from outside of the body 101 to flow inside of the body 101. Arrows F show the direction of polymer flow during normal operation. In one embodiment, as will be explained in greater detail below in connection with FIG. 3 and FIG. 6, the area of (or defined by) the openings 301 of the holes 108 on the outside surface of the cylinder wall 104 is larger than the area of (or defined by) the openings 302 of the corresponding holes on the inside surface of the cylinder wall 104. Additionally, in a preferred embodiment, the shape of the openings 301 of the holes 108 on the outside surface of the cylinder wall 104 is non-circular. By "non-circular," it is meant any geometric shape except for a perfect circle. Examples of non-circular shapes include triangles, squares, rectangles, ovals, ellipses, quatrefoils, rhombuses, pentagons, hexagons, etc.

The number of holes in the second end portion 106 may be any number desired. In one embodiment, the second end portion 106 includes 288 holes arranged in 18 rows of 16 holes per row. In another embodiment, the second end portion 106 includes 400 holes arranged in 25 rows of 16 holes per row.

The cylindrical body 101 may be made of any material that can withstand the conditions inside of a filtering apparatus for a polymer melt over an extended period of time. Such conditions include operating temperatures of up to 400° C. and operating pressures of up to 7,500 psi (or approximately 50 MPa). Preferably, the cylindrical body 101 is made of 17-4 PH stainless steel, which has been heat treated according to Condition H 900 after the body 101 has been machined. 17-4 PH stainless steel is a precipitation-hardening martensitic stainless steel. It generally contains 15-17.5 wt % of chromium, 3-5 wt % of copper, 3-5 wt % of nickel, 0.15-0.45 wt % of niobium plus tantalum, and the balance of iron. 17-4 PH stainless steel may contain up to 0.07 wt % of carbon, up to 1 wt % of manganese, up to 0.04 wt % of phosphorus, up to 0.03 wt % of sulfur, and up to 1 wt % of silicon. 17-4 PH is commercially available. It is typically furnished in the annealed condition. This is also called the solution heat treated condition, or Condition A. According to Condition A, annealing is conducted by heat treating at approximately 1900° F. (1040° C.) to 1950° F. (1065° C.) and cooling to room temperature. In this condition, the material possesses a martensitic structure. To further increase its strength, the cylindrical body 101 is preferably precipitation hardened, after machining, by heat treatment in air at 900° F.+/−10° F. (482° C.+/−5° C.) for 60 minutes+/−5 minutes, which is known as Condition H 900.

The cylindrical body 101 can be of any desired size. In one embodiment, the body 101 has a height of 4.97 inches (12.62 cm). In another embodiment, the body 101 has a height of 6.40 inches (16.256 cm). Preferably, the height of the first end portion 105 is the same regardless of the overall height of the body 101. In one embodiment, the height of the first end portion 105 is 0.88 inches (2.24 cm). In which case, the height of the second end portion 106 can be 3.97 inches (10.08 cm) or 5.4 inches (13.72 cm).

Preferably, the ratio of the outside diameter of the cylinder wall 104 to the inside diameter of the cylinder wall 104 ranges from 1.35 to 1.65. In one embodiment, the cylinder wall 104 has an outside diameter of 1.75 inches (4.445 cm). In which case, the cylinder wall 104 can have an inside diameter of 1 inch (2.54 cm) to 1.25 inches (3.175 cm). Preferably, the cylinder wall 104 has an inside diameter of 1.125 inches (2.858 cm).

Figure 2:
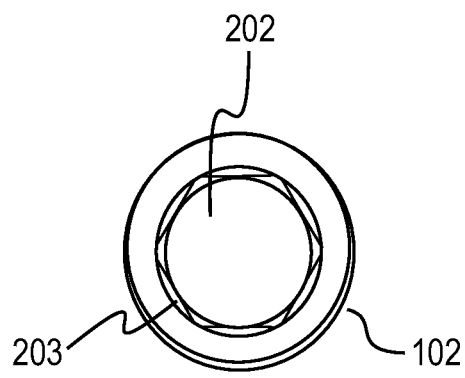
FIG. 2 is a plan view of the bottom end of a polymer melt filter support according to one embodiment of the invention.
Figure 4:
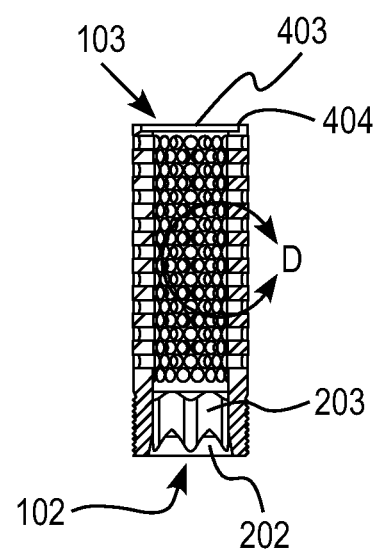
FIG. 4 is a sectional view of the polymer melt filter support along line C-C in FIG. 1.
Figure 5:
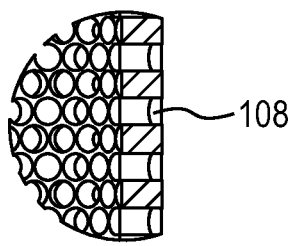
FIG. 5 is an enlarged view of cutout D from the sectional view in FIG. 4.

As seen from FIGS. 2, 4, and 5, the first end 102 includes an opening 202 for the polymer melt inside of the body 101 to flow outside of the body 101. In one embodiment, the inside surface of the first end portion 105 includes a hex fitting 203 for receiving and engaging with a hex wrench (not shown). The hex fitting 203, via the use of a hex wrench, enables the filter support 100 to be easily attached to and removed from the support plate 1604 (FIGS. 16-19). In the case the inside diameter of the cylinder wall 104 is 1.125 inches (2.858 cm), the farthest distance between any two opposing points of the hex fitting 203 can be, for example, 1.27 inches (3.226 cm).

Figure 3:
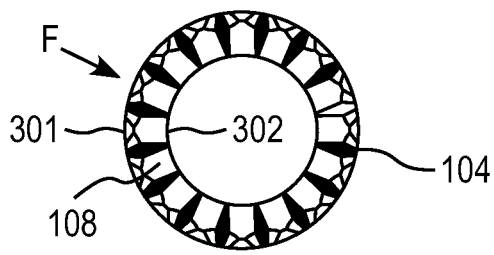
FIG. 3 is a sectional view of the polymer melt filter support along line A-A in FIG. 1.

FIG. 3 shows a sectional view of the filter support 100 and, in particular, a sectional view of the second end portion 106 of the cylindrical body 101 along line A-A in FIG. 1. The cylinder wall 104 is represented by the solid areas. The clear areas between the solid areas represent the holes 108 in the cylinder wall 104. From this view, it can be seen that this embodiment of the filter support 100 contains 16 holes in this row (the number of holes per row as well as the number of rows of holes can vary as desired). Moreover, it can be seen that the size or area of the openings 301 of the holes 108 on the outer surface of the cylinder wall 104 is larger than the size or area of the openings 302 of the corresponding holes 108 on the inner surface of the cylinder wall 104. The direction of polymer melt flow through the holes 108 is marked by the arrow F. It has been surprisingly discovered that the larger size of the openings 301 on the outer wall surface increases the cross-sectional area for the polymer melt to flow and be filtered, thereby increasing the overall filtration efficiency of any filter that employs the filter support according to the invention.

FIG. 4 is a sectional view of the filter support 100 from FIG. 1 along line C-C. From this view, the hollowness of the cylindrical body 101 can be seen as well as the opening 202 located at the first end 102 and the opening 403 located at the second end 103. The hex fitting 203 on the inside surface of the first end portion 105 of the cylindrical body 101 can also be seen from this view. FIG. 4 further shows an optional recess, indentation, or notch 404 along the inside surface of the cylindrical wall 104 at the opening 403.

FIG. 5 is an enlarged view of the second end portion 106 of the cylinder wall 104 along circle D from FIG. 4. In this view, the rows of holes 108 in the second end portion 106 of the cylinder wall 104 can be seen.

Figure 6:
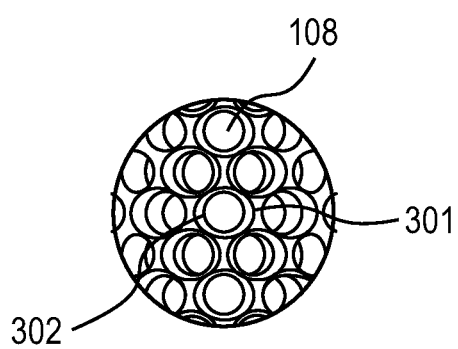
FIG. 6 is an enlarged view of area B from the cylindrical wall of the second end portion in FIG. 1.

FIG. 6 is an enlarged view of the second end portion 106 of the cylinder wall 104 around area B from FIG. 1. From this view, the rows of the holes 108 in the second end portion 106 of the cylinder wall 104 can be seen as well as the details of the holes 108. As noted above, in accordance with one embodiment of the invention, the size or area of the openings 301 of the holes 108 on the outer surface of the cylinder wall 104 is larger than the size or area of the openings 302 of the corresponding holes 108 on the inner surface of the cylinder wall 104. The openings 301 and 302 can take any shape, provided that the size of the openings 301 on the outer surface is larger than the size of the openings 302 on the inner surface. The shapes of the openings may be formed by any known machining technique. In one embodiment, the shape of the openings 301 on the outside surface of the cylinder wall 104 is non-circular. Preferably, the openings 301 have shapes resembling an oval or an ellipse. As used herein, the terms "oval" and "ellipse" (and variations thereof) are intended to include shapes that are generally or substantially oval, and generally or substantially elliptic, respectively. When modifying geometric shapes, the terms "generally" and "substantially" mean that the actual shape resembles the named shape more than any other basic geometric shape, such as triangle, square, rectangle, circle, and oval/ellipse.

Preferably, the greatest distance between any two opposing points on the perimeter of the oval or elliptic openings 301 in the horizontal direction is greater than the greatest distance between any two opposing points on the perimeter of the oval or elliptic openings 301 in the vertical direction. In other words, the horizontal diameter ($D_H$) of the oval or elliptic openings 301 is preferably greater than the vertical diameter ($D_V$) of the openings 301. The ratio of $D_H/D_V$ can be at least 1.05, at least 1.10, at least 1.15, at least 1.20, at least 1.21, at least 1.22, at least 1.23, or at least 1.24. Vertical refers the direction along (or parallel to) the axis of the cylindrical body 101, and horizontal refers to the direction perpendicular to the axis of the cylindrical body 101.

In one embodiment, the oval or elliptic shapes of the openings 301 are formed by first forming circular openings, and then taking scalloped cuts on opposing sides of the circular openings to form the oval- or elliptic-shaped openings. In the case of FIG. 6, the scalloped cuts are made on the left and right sides of the originally circular openings. The scalloped cuts give the left and right sides of the openings 301 a generally chamfered profile.

Figure 6A:
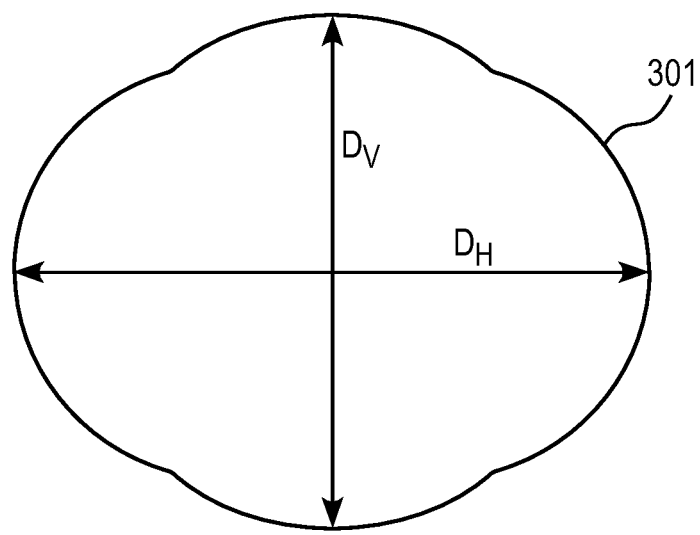
FIG. 6A is an enlarged view of a hole on the outside surface of the cylindrical wall of the second end portion in FIG. 1.

FIG. 6A is an exploded view of one of the oval/elliptic openings 301 with markings showing $D_V$ and $D_H$. As seen from FIG. 6A, the shape of the opening 301 is not a perfect oval or ellipse, but to the naked eye, it resembles an oval or ellipse more than other basic geometric shape. In one embodiment, $D_H$ is 0.236 inches (6 mm) and $D_V$ is 0.290 inches (7.4 mm), giving rise to an open area of 0.05165 in$^2$ (33.3 mm$^2$). In another embodiment, $D_H$ is 0.250 inches (6.35 mm) and $D_V$ is 0.310 inches (7.87 mm), giving rise to an open area of 0.05859 in$^2$ (37.8 mm$^2$).

Preferably, the shape of the openings 302 of the corresponding holes 108 on the inside surface of the cylinder wall 104 is circular. The term "circular," as used herein, is intended to include generally circular or substantially circular shapes.

The area or size of the openings (inlets) 301 can be, for example, at least 25%, 50%, or 75% larger than the area or size of the openings (outlets) 302 of the corresponding holes 108.

Also, as shown in FIG. 6, to maximize the size and number of the holes 108, each row of holes 108 can be staggered or offset from the rows immediately above and below it. For example, each row of holes 108 can be staggered or offset from the next row by the radius of the openings 302.

Figure 7:
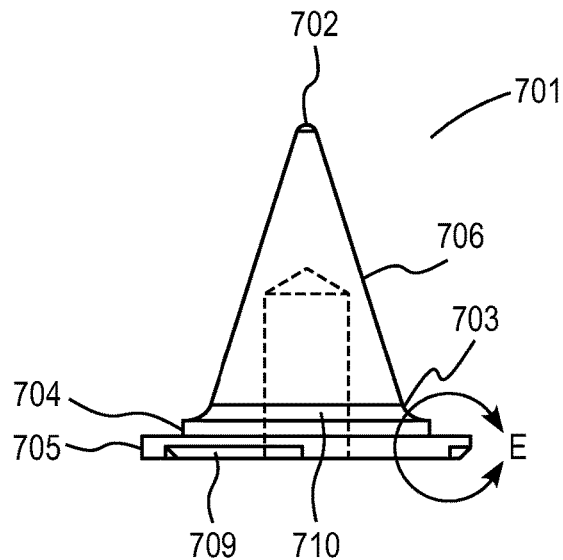
FIG. 7 is an elevation view of a cone insert according to an embodiment of the invention.

FIG. 7 shows a cone insert 701 according to an embodiment of the invention. As seen from FIG. 15, the cone insert 701 is adapted to fit inside of the second end opening 403 of the cylindrical body 101, with the apex 702 of the cone insert 701 pointing towards the first end opening 202. As seen from FIGS. 7, 9, and 15, the cone insert 701 includes a curved lateral surface 703 towards, proximate, or adjacent to its base 704. The curved lateral surface 703 serves the function of gradually directing the inflow of polymer melt towards the center of the cylindrical body 101.

The base 704 has a diameter that is about the same as or slightly smaller than the inside diameter of the cylindrical body 101. Any gap between the diameter of the base 704 and the inside diameter of the cylindrical body 101 should be minimized so as to avoid polymer melt from collecting in or passing through the gap. The thickness of the base 704 should be such that the top row 1501 of holes 108 directs the flow of polymer melt towards in the curved lateral surface 703 inside of the cylindrical body 101. The curved lateral surface 703 together with the non-curved lateral surface 706 of the cone insert 701 gradually directs the flow of incoming polymer melt towards the direction of the first end opening 202 where the filtered polymer melt eventually exits the filter support 100.

The cone insert 701 also includes a base plate 705 located on the other side of the base 704, i.e., opposite the side with the curved lateral surface 703. The base plate 705 preferably has a diameter that is larger than the inside diameter of the cylindrical body 101, but smaller than the outside diameter of the cylindrical body 101. The perimeter portion 707 (see FIG. 8) of the base plate 705 is designed to abut or rest against the annular recess 404 in the cylinder wall 104 adjacent the second end opening 403. Preferably, the thickness of the base plate 705 is such that the top surface 708 of the plate 705 is flush or level with the remaining cylinder wall 104 at the second end opening 403.

Figure 8:
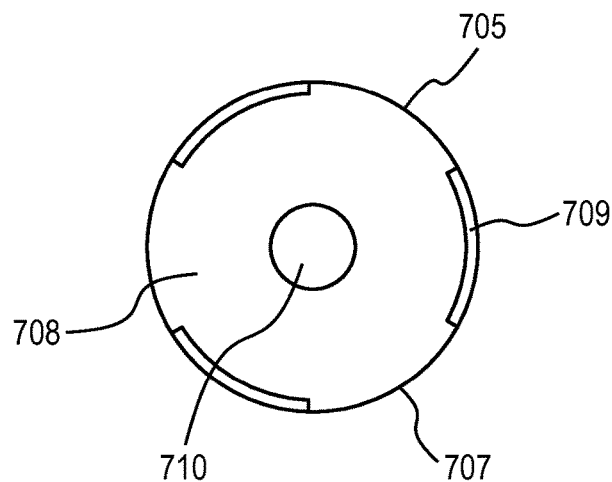
FIG. 8 is a plan view of the top of the cone insert in FIG. 7.
Figure 9:
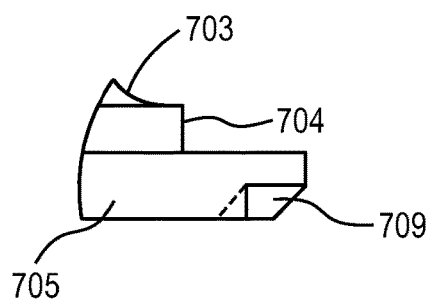
FIG. 9 is an enlarged view of cutout E from the cone insert in FIG. 7.

As seen from FIGS. 7, 8, and 9, the base plate 705 preferably includes one or more bevels or recesses 709 around the perimeter of the top surface 708. The recesses 709 form reservoirs for solder, weld metal, or some other adhesive material, to join the cone insert 701 with the filter support 100.

Figure 15:
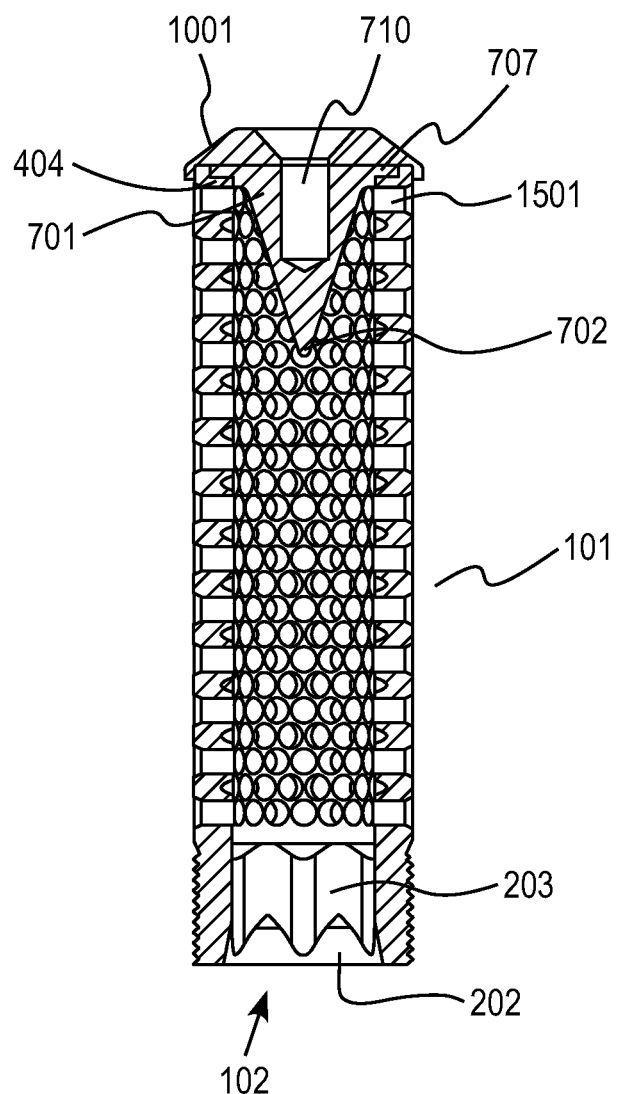
FIG. 15 is a sectional view of the polymer filter support along line A-A in FIG. 14.
Figure 16:
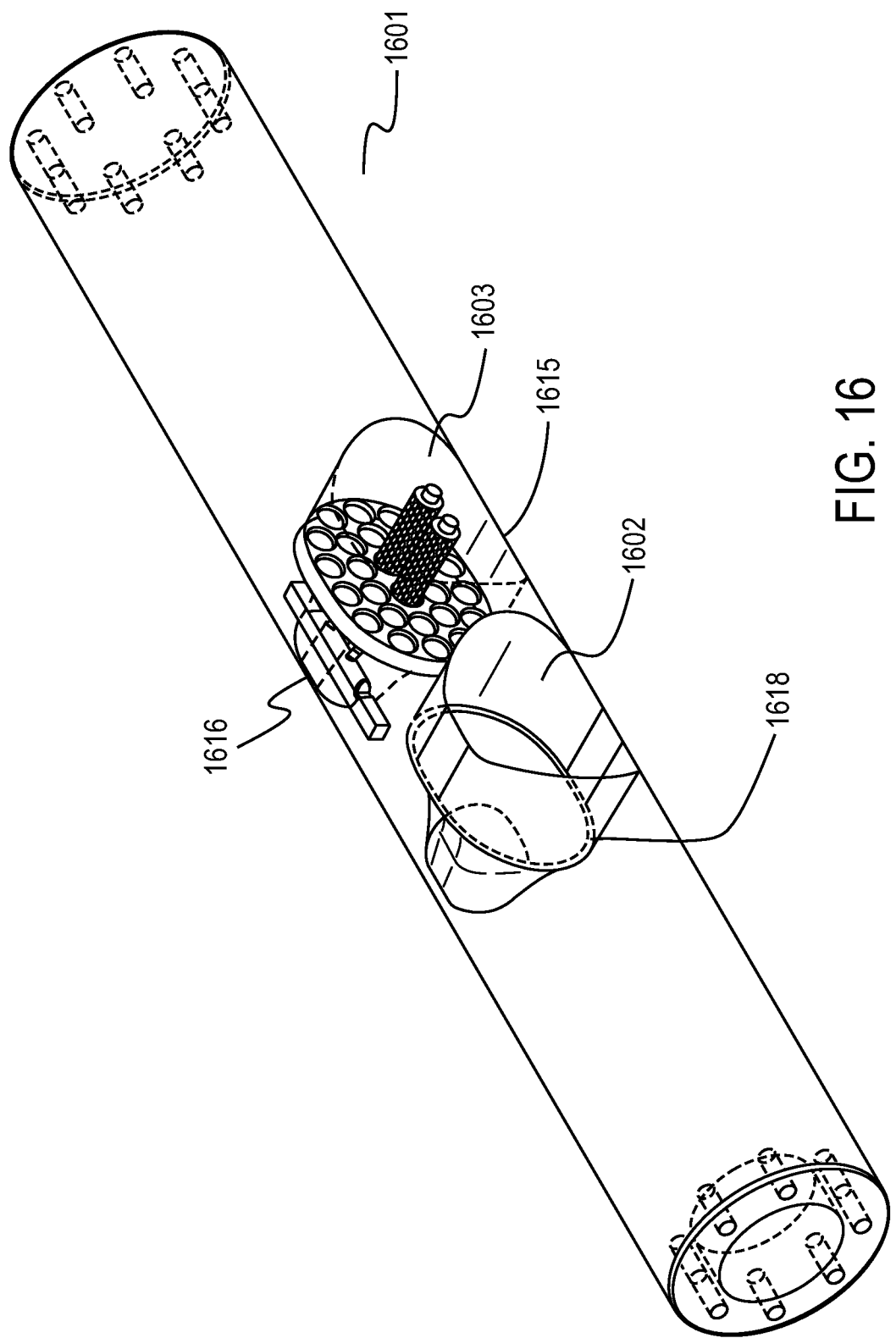
FIG. 16 is a perspective (see-through) view of a shaft from a filtering apparatus with a polymer melt filter plate assembly according to an embodiment of the invention in a connecting channel.
Figure 17:
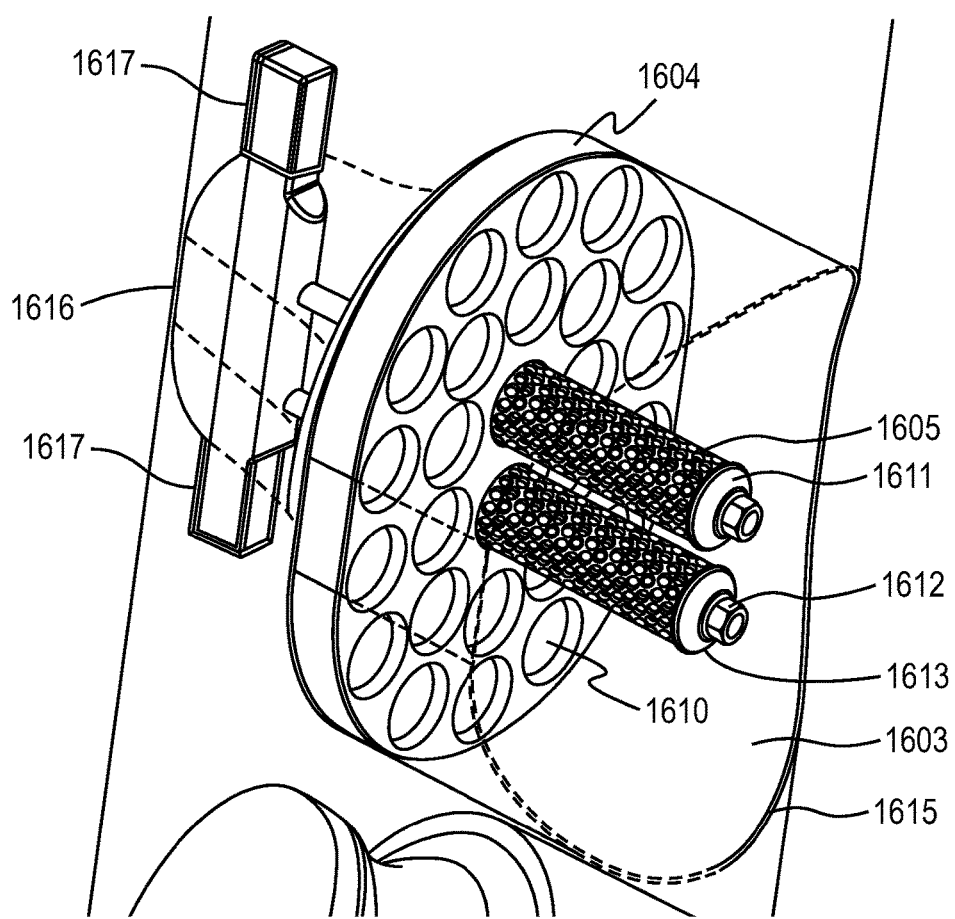
FIG. 17 is a detailed, perspective view of the inlet of the connecting channel with the filter plate assembly depicted in FIG. 16.
Figure 18:
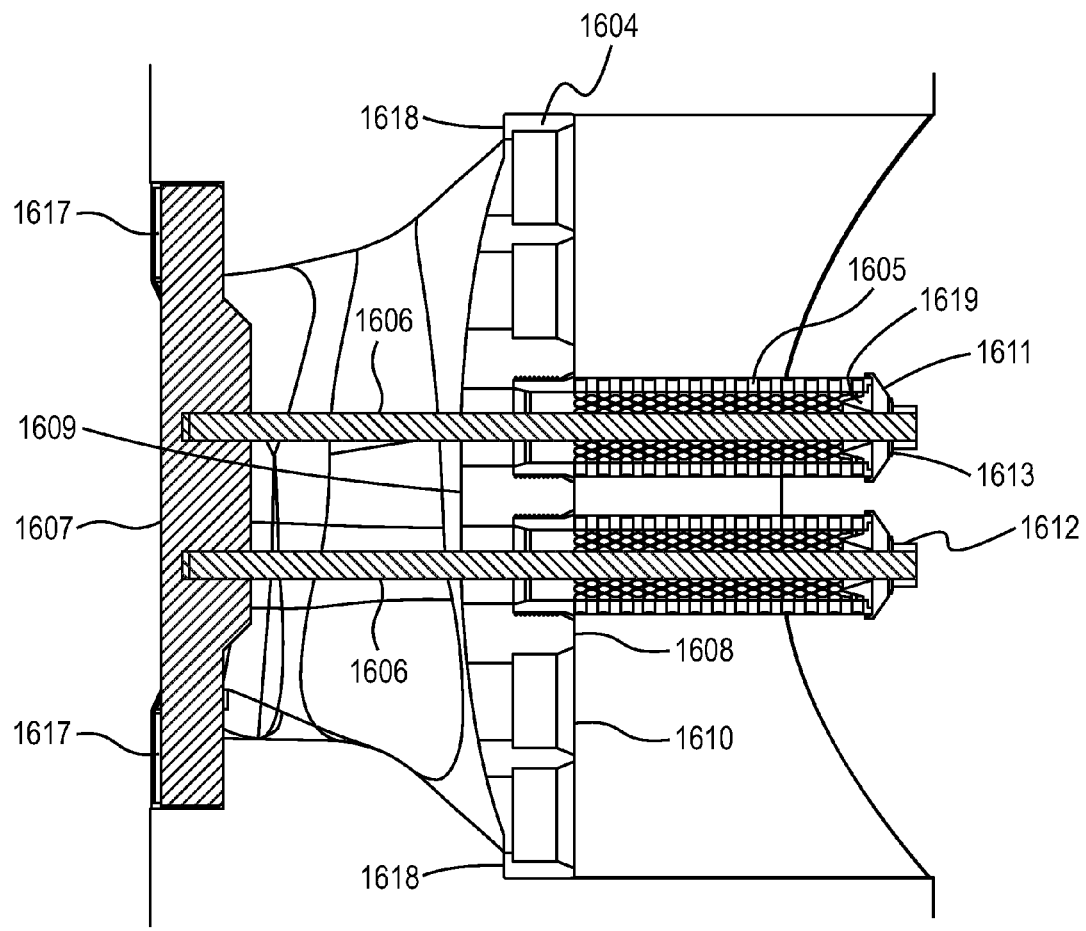
FIG. 18 is a sectional view of the filter plate assembly inside of the shaft depicted in FIG. 16.
Figure 19:
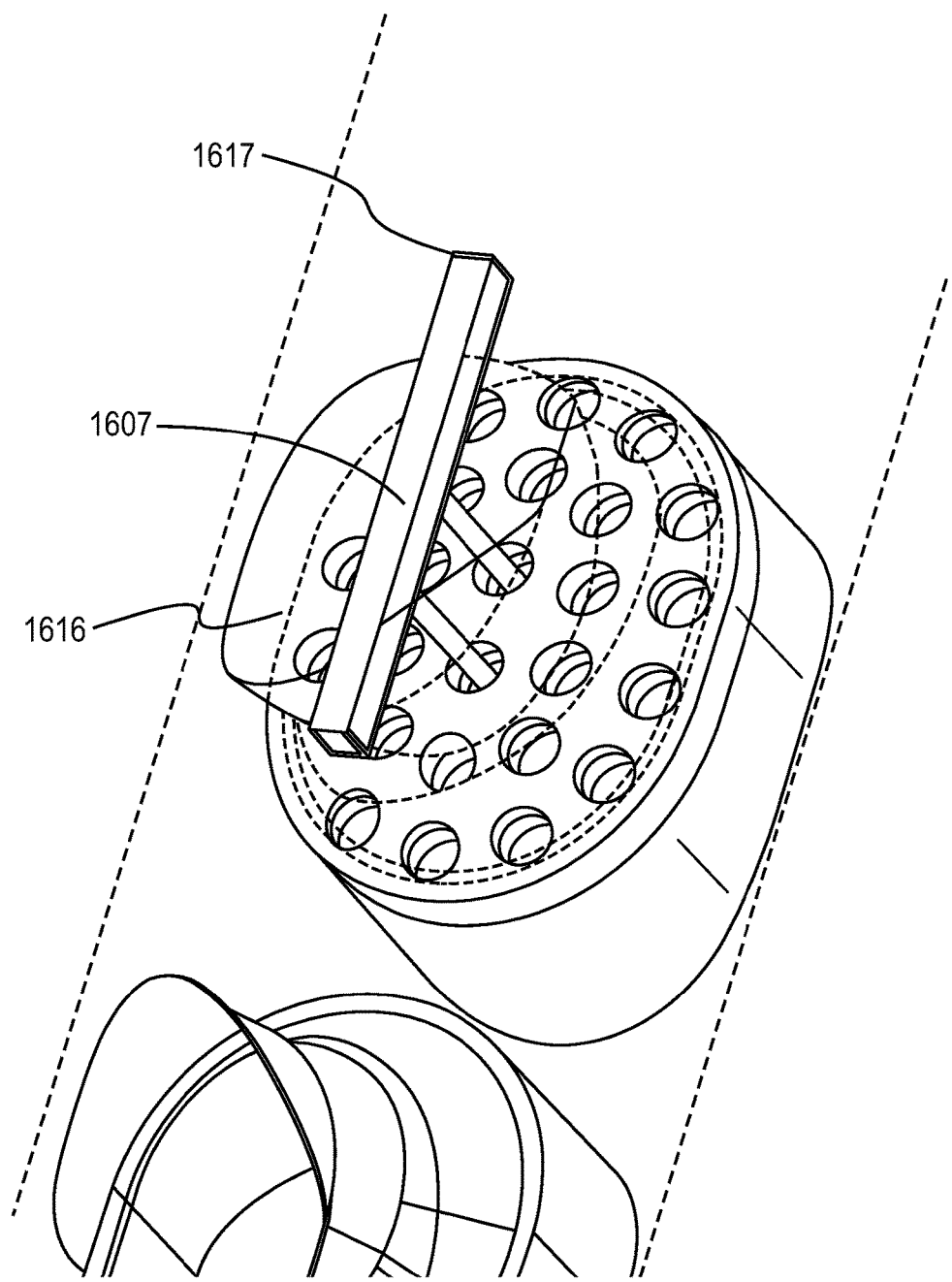
FIG. 19 is a detailed, perspective view of the outlet of the connecting channel with the filter plate assembly depicted in FIG. 16.

As seen from FIGS. 7, 8, and 15, the cone insert 701 can also include a screw hole 710 for securing a cap 1001 onto the insert 701.

Figure 10:
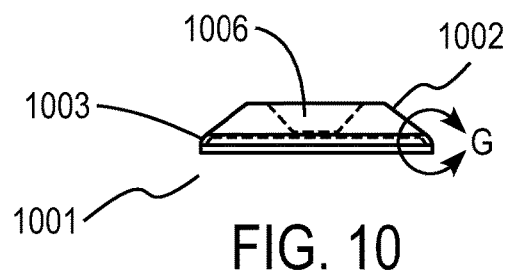
FIG. 10 is an elevation view of a filter support cap according to an embodiment of the invention.
Figure 11:
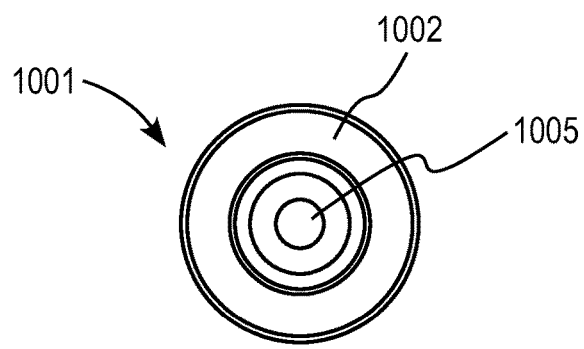
FIG. 11 is a plan view of the cap shown in FIG. 10.
Figure 12:
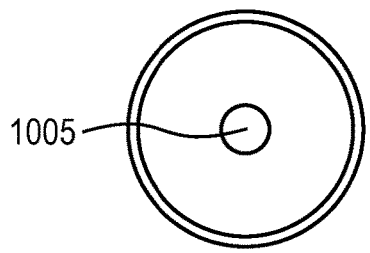
FIG. 12 is a plan view from the bottom of the cap shown in FIG. 10.

FIGS. 10, 11, and 12 show various views of a filter support cap 1001 according to an embodiment of the invention. As seen from FIGS. 14, 14A, and 15, the cap 1001 is adapted to fit over the second end 103 of the cylindrical body 101 as well as the base plate 705 of the cone insert 701. As seen from FIGS. 10 and 13, the cap 1001 has a generally frustoconical shape, with a sloping side portion 1002, a curved side portion 1003 below the sloping side portion 1002, and a vertical side portion 1004 below the curved side portion 1003. The cap 1001 includes a hole 1005 through its central axis for passing through a screw body (shank). The screw (not shown) threads directly into the screw hole 710 in the cone insert 701 and secures the cap 1001 to the cone insert 701. When the cone insert 701 has been welded or otherwise secured onto the cylindrical body 101, the screw would also secure the cap 1001 to the cylindrical body 101. The cap 1001 may include a recessed area 1006 having a generally inverted frustoconical shape in the top portion around the hole 1005 for receiving the conical portion of a flat head or countersunk screw (not shown).

Figure 13:
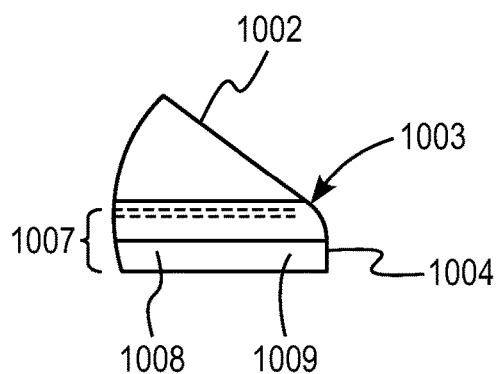
FIG. 13 is an enlarged view of cutout G from the cap shown in FIG. 10.
Figure 14:
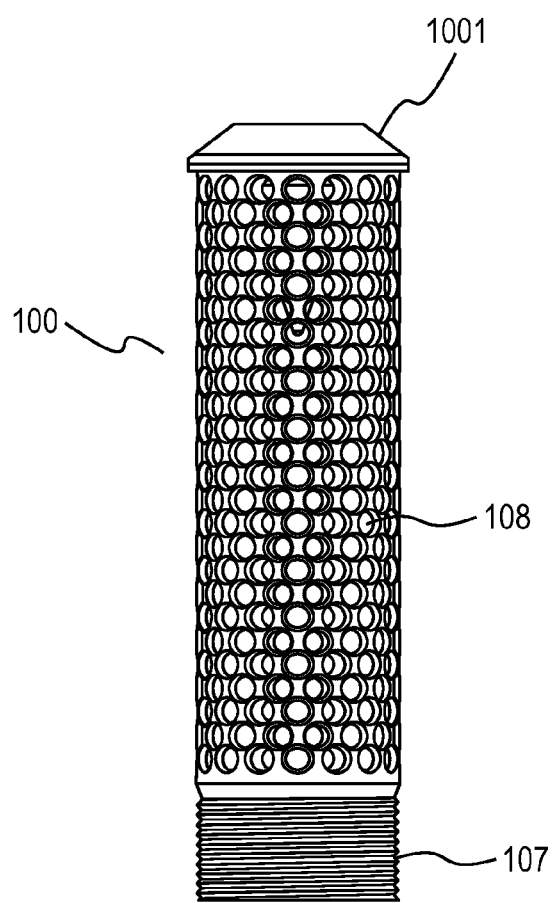
FIG. 14 is a plan view of the polymer filter support shown in FIG. 1 fitted with a cone insert and a cap.

As seen from FIGS. 10 and 13, the bottom portion 1007 of the cap 1001 includes the curved side portion 1003 and the vertical side portion 1004. The outside diameter of the curved side portion 1003 and the vertical side portion 1004 is larger than the outside diameter of the cylindrical body 101. The interior of the bottom portion 1007 includes a recess 1008 for receiving the second end 103 of the cylindrical body 101. The interior of the bottom portion 1007 includes a sloping surface 1009, which slopes away from the outside surface of the cylinder wall 104. The space created between the sloping surface 1009 and the outside surface of the cylinder wall 104 allows for one or more filter elements to be held in place, around the second end portion 103 of the cylindrical body 104.

In another embodiment of the invention, the cone insert 701 and the cap 1001 include a hole through their axes for accommodating a tie rod. This embodiment is discussed in more detail below in connection with FIGS. 16-19.

In a second aspect, the present invention provides a polymer melt filter. The filter comprises the filter support according to any of the embodiments of the invention and one or more filter elements around the second end portion of the cylindrical body. There are no particular restrictions on the filter elements that may be used with the filter support of the invention, so long as they can be adapted to fit around the second end portion of the cylindrical body. Examples of filter element media include metal fiber felt, woven wire cloth, wire mesh, screen mesh, metal fiber fleeze, and a perforated metal sheet. Combinations of filter elements may be used. The filter elements may be flat or pleated. The filter elements may have any desired fineness, such as from 0.5 to 500 µm, or from 0.5 to 200 µm.

Figure 14A:
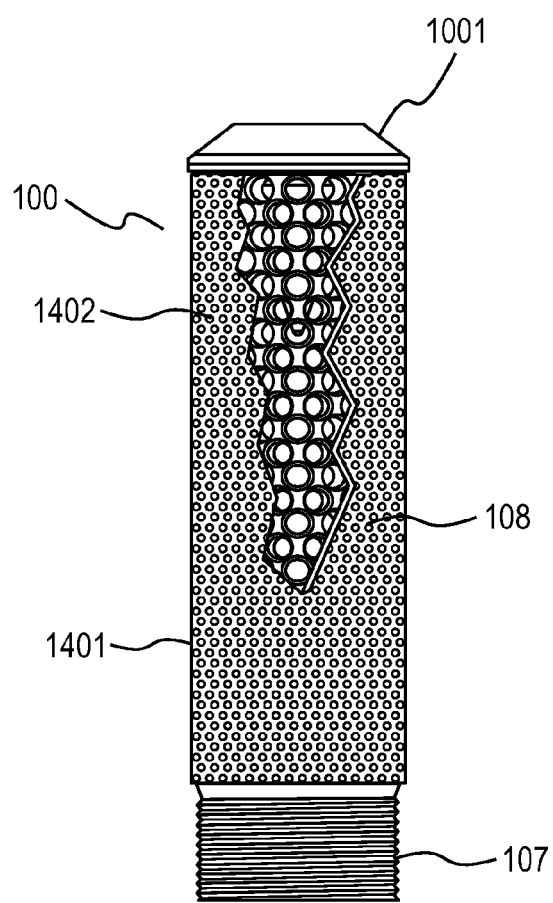
FIG. 14A is a plan view of the polymer filter support shown in FIG. 14 fitted with a filter sleeve over the second end portion.

FIG. 14A illustrates an embodiment of the second aspect of the invention. FIG. 14A shows a filter element 1401 in the form of a sleeve adapted to fit over/around the second end portion 106 of the filter support 100. The filter element 1401 has perforations 1402 to let the polymer melt to pass through, but to filter out impurities in the melt, such as solids and/or gels.

The types of polymer melts that can be filtered using the filter according to the invention are not particularly limiting. Examples of suitable polymers include poly(acrylonitrile butadiene styrene), ethylene vinyl acetate copolymer, polyethylenes (including HDPE, LDPE, and LLDPE), polyamides (including PA 6 and PA 66), polybutadiene, polyesters (including PET and PBT), polypropylene, and polystyrenes (including HIPS).

In use, a polymer melt first passes through the one or more filter elements to remove any undesired solids and/or gels in the melt. The melt then enters the inside of the hollow cylindrical body 101 of the filter support 100 via the holes 108 in the cylinder wall 104. The polymer melt then exits the interior of the hollow cylindrical body 101 via the opening 202 in the first end 102 of the body 101.

In a third aspect, the present invention provides a polymer melt filter plate assembly. The plate assembly comprises:

(a) a support plate comprising a plurality of threaded holes; and (b) at least one filter according to the invention, which is screwed into at least one of the threaded holes via the screw thread on the outside surface of the first end portion of the cylindrical body.

The support plate may have two or more threaded holes into which the filters may be screwed. The number of threaded holes can vary, for example, from 2 to 50. In one embodiment, the support plate includes 24 to 26 holes. The threaded holes are typically oriented perpendicular to a planar surface of the support plate.

The support plate may be made of any material that can withstand the conditions inside of a polymer filtration system over an extended period of time. Such conditions include operating temperatures of up to 400° C. and operating pressures of up to 7,500 psi (or approximately 50 MPa). In one embodiment, the support plate is made of Custom 465® stainless steel, which has been heat treated according to Condition H 900 or H 950. Custom 465® stainless steel generally contains 11.00 to 12.50 wt % of chromium, 10.75 to 11.25 wt % of nickel, 0.75 to 1.25 wt % of molybdenum, 1.50 to 1.80 wt % of titanium, and the balance of iron. Custom 465® stainless steel may contain up to 0.02 wt % of carbon, up to 0.015 wt % of phosphorus, up to 0.25 wt % of silicon, up to 0.25 wt % of manganese, and up to 0.010 wt % of sulfur. Custom 465® stainless steel is commercially available. It is typically furnished in the annealed/CT condition. This condition includes heating to 1800° F.±15° F. (982° C.±8° C.), holding at temperature for one hour, and rapidly cooling. The solution annealing is typically followed by refrigerating to −100° F. (−73° C.), holding at temperature for eight hours, then warming to room temperature (CT). The subzero cooling is usually performed within 24 hours of the solution annealing.

Condition H 900 refers to heat treatment in air at 900° F.+/−10° F. (482° C.+/−5° C.) for 60 minutes+/−5 minutes. Condition H 950 refers to heat treatment in air at 950° F.+/−10° F. (510° C.+/−5° C.) for 4 hours+/−0.25 hours.

In one embodiment, the filter plate assembly includes at least one filter that includes a cone insert and a cap having a hole through their axes for accommodating a tie rod. The tie rod has a first end extending through the hole in the cone insert and the cap, and a second end extending through the support plate of the assembly. The assembly further includes a cross bar, which is attached to the second end of the tie rod for holding the support plate inside a shaft of an apparatus for filtering a polymer melt. This embodiment of the filter plate assembly is illustrated in FIGS. 16, 17, 18, and 19.

By way of background, a polymer melt filtering apparatus typically includes (a) a housing comprising an inlet channel for receiving a flow of polymer melt, a cross-bore for accommodating a movable shaft, and an outlet channel for discharging a filtered polymer melt; and (b) a movable shaft comprising a plurality of connecting channels arranged side-by-side and spanning the thickness of the shaft for connecting the inlet channel to the outlet channel. Each connecting channel includes a filter support plate assembly, which is situated across the flow direction of the polymer melt, for filtering the polymer melt. The shaft is mounted in the cross-bore of the housing and is movable in the axial direction, so that each connecting channel can be moved between a filtration position in which the inlet channel is connected to the outlet channel through the connecting channel, and a cleaning position in which the connection from the inlet channel to the outlet channel is interrupted and the plate assembly is externally accessible for cleaning.

FIGS. 16, 17, 18, and 19 show a movable shaft 1601 with two connecting channels 1602 and 1603 arranged side-by-side and spanning the thickness of the shaft 1601 for connecting the inlet channel to the outlet channel. Connecting channel 1603 is provided with a filter plate assembly according to the invention. In the embodiment shown, the plate assembly includes a support plate 1604, two filter supports 1605, two tie rods 1606, and a cross bar 1607.

The support plate 1604 has a planar supporting surface 1608 on one side, a convex surface 1609 on the other side, and a plurality of threaded holes 1610. In the embodiment shown, the filter supports 1605 are attached to two adjacent, centrally located threaded holes 1610. Each of the filter supports 1605 is provided with a cone insert 1619 and a cap 1611. The cone insert 1619 and cap 1611 have a hole through their center for accommodating the tie rod 1606. The inside surface of the through-hole in the cone insert 1619 may be tapered to help guide the tie rod 1606 through the cone insert 1619. The larger end of the taper is towards the apex of the cone insert 1619.

The tie rod 1606 may be threaded at both ends. One end of the tie rod 1606 engages with a nut 1612. A washer 1613 may be placed between the nut 1612 and the cap 1611. The other end of the tie rod 1606 is threaded into a threaded hole 1614 in the cross bar 1607. The body of the tie rod 1606 passes through the center of the filter support 1605.

The connecting channel 1603 in the shaft 1601 has an inlet 1615 and an outlet 1616. The connecting channel 1603 also includes a ledge or projection 1618 running radially and protruding into the channel 1603, serving to support the support plate 1604. The cross bar 1607 has sufficient length to span the width of the outlet 1616. The shaft 1601 includes recesses 1617 adjacent the outlet 1616 (opening on downstream side of the connecting channel 1603) for accommodating the cross bar 1607. The tie rod 1606, together with the cross bar 1607 and the nut 1612, surely holds the support plate 1604 against the ledge 1618 inside of the shaft 1601. This mechanism for holding the support plate 1604 in place has a number of advantages, including minimizing or preventing the support plate from substantially moving (e.g., vibrating) during filtration, which can cause premature cracking or breakage.

Figure 20:
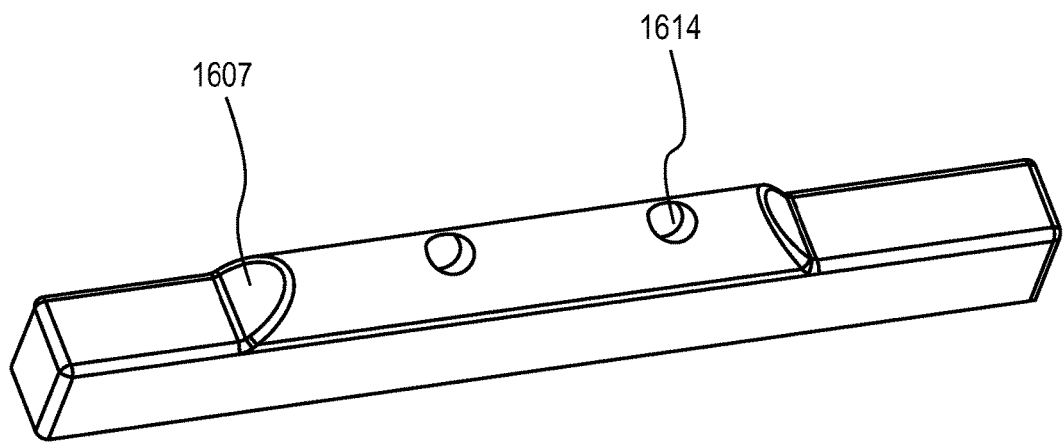
FIG. 20 is a perspective view of a cross bar according to an embodiment of the invention, which spans the width of the outlet of the connecting channel depicted in FIG. 19.

FIG. 20 shows an exemplary shape of the cross bar 1607 with two threaded holes 1614 for engaging with a threaded end of the tie rod 1606.

Although two tie rods 1606 are depicted in FIGS. 16-19, one or more than two may be used.

The cap 1001, cap insert 701, tie rods 1606, and cross bar 1607 may be made of any suitable material that can withstand the operating conditions. An example of such material is 17-4 PH stainless steel which has been heat treated according to Condition H 900.

In a fourth aspect, the present invention provides a process for filtering a polymer melt. The process comprises passing a polymer melt through the one or more filter elements around the second end portion of the cylindrical body of the polymer melt filter according to the invention, and withdrawing a filtered polymer melt from the inside of the cylindrical body.

The present invention includes and expressly contemplates any and all combinations of embodiments, features, characteristics, parameters, and/or ranges disclosed herein. That is, the invention may be defined by any combination of embodiments, features, characteristics, parameters, and/or ranges mentioned herein.

As used herein, the indefinite articles "a" and "an" mean one or more, unless the context clearly suggests otherwise. Similarly, the singular form of nouns includes their plural form, and vice versa, unless the context clearly suggests otherwise.

While attempts have been made to be precise, the numerical values and ranges described herein should be considered to be approximations (even when not qualified by the term "about"). These values and ranges may vary from their stated numbers depending upon the desired properties sought to be obtained by the present invention as well as the variations resulting from the standard deviation found in the measuring techniques. Moreover, the ranges described herein are intended and specifically contemplated to include all sub-ranges and values within the stated ranges. For example, a range of 50 to 100 is intended to describe and include all values within the range including sub-ranges such as 60 to 90 and 70 to 80.

The content of all documents cited herein, including patents as well as non-patent literature, is hereby incorporated by reference in their entirety. To the extent that any incorporated subject matter contradicts with any disclosure herein, the disclosure herein shall take precedence over the incorporated content.

The invention has been described in detail with particular reference to preferred embodiments thereof, but it will be understood that variations and modifications can be effected within the spirit and scope of the invention.

We claim:

1. A polymer melt filter support comprising:
    a hollow cylindrical body defined by a first end, a second end, and a cylinder wall having a first end portion and a second end portion;
    a screw thread on the outside surface of the first end portion;
    a plurality of holes in the cylinder wall at the second end portion;
    an opening at the second end; and
    a cone insert adapted to fit inside of the second end opening,
    wherein the cone insert comprises a base plate,
    wherein the perimeter of the top surface of the base plate comprises one or more recesses, wherein the recesses and an inner surface of the cylindrical body define a reservoir for holding solder or weld metal for joining the cone insert to the cylindrical body, wherein the holes allow for a polymer melt outside of the cylindrical body to flow inside of the cylindrical body, wherein the first end comprises an opening for the polymer melt inside of the cylindrical body to flow outside of the cylindrical body, wherein the area of the openings of the holes on the outside surface of the cylinder wall is larger than the area of the openings of the corresponding holes on the inside surface of the cylinder wall, and wherein the shape of the openings of the holes on the outside surface is non-circular.

2. The filter support according to claim 1, wherein the cylindrical body is made of 17-4 PH stainless steel which has been heat treated according to Condition H 900.

3. The filter support according to claim 1, wherein the ratio of the outside diameter of the cylinder wall to the inside diameter of the cylinder wall ranges from 1.35 to 1.65.

4. The filter support according to claim 1, which further comprises a hex fitting on the inside surface of the first end portion of the cylindrical body for receiving a hex wrench.

5. The filter support according to claim 1, which further comprises a cap for securing one or more filter elements around the second end portion of the cylindrical body.

6. The filter support according to claim 1, wherein the cone insert comprises a curved lateral surface towards its base.

7. The filter support according to claim 1, wherein the area of the openings of the holes on the outside surface of the cylindrical body wall is at least 25% larger than the area of the openings of the corresponding holes on the inside surface of the cylindrical body wall.

8. The filter support according to claim 1, wherein the area of the openings of the holes on the outside surface of the cylindrical body wall is at least 50% larger than the area of the openings of the corresponding holes on the inside surface of the cylindrical body wall.

9. The filter support according to claim 1, wherein the area of the openings of the holes on the outside surface of the cylindrical body wall is at least 75% larger than the area of the openings of the corresponding holes on the inside surface of the cylindrical body wall.

10. The filter support according to claim 1, wherein the shape of the openings of the holes on the outside surface of the cylinder wall is oval or elliptic, and the shape of the openings of the corresponding holes on the inside surface of the cylinder wall is circular.

11. A polymer melt filter comprising the filter support according to claim 1 and one or more filter elements around the second end portion of the cylindrical body.

12. The filter according to claim 11, wherein the filter elements comprise metal fiber felt, woven wire cloth, wire mesh, or a perforated metal sheet.

13. The filter according to claim 11, wherein the filter elements are flat or pleated.

14. The filter according to claim 11, wherein the cylindrical body is made of 17-4 PH stainless steel which has been heat treated according to Condition H 900.

15. A polymer melt filter plate assembly comprising:
(a) a support plate comprising a plurality of threaded holes; and
(b) at least one filter according to claim 11, which is screwed into at least one of the threaded holes via the screw thread on the outside surface of the first end portion of the cylindrical body.

16. The plate assembly according to claim 15, wherein the support plate is made of a stainless steel comprising 11.00 to 12.50 wt % of chromium, 10.75 to 11.25 wt % of nickel, 0.75 to 1.25 wt % of molybdenum, 1.50 to 1.80 wt % of titanium, and the balance of iron; and wherein the stainless steel has been heat treated according to Condition H 900 or H 950.

17. A process for filtering a polymer melt, the process comprising passing a polymer melt through the one or more filter elements around the second end portion of the cylindrical body of the polymer melt filter according to claim 11, and withdrawing a filtered polymer melt from the inside of the cylindrical body.

* * * * *